Figure 1:
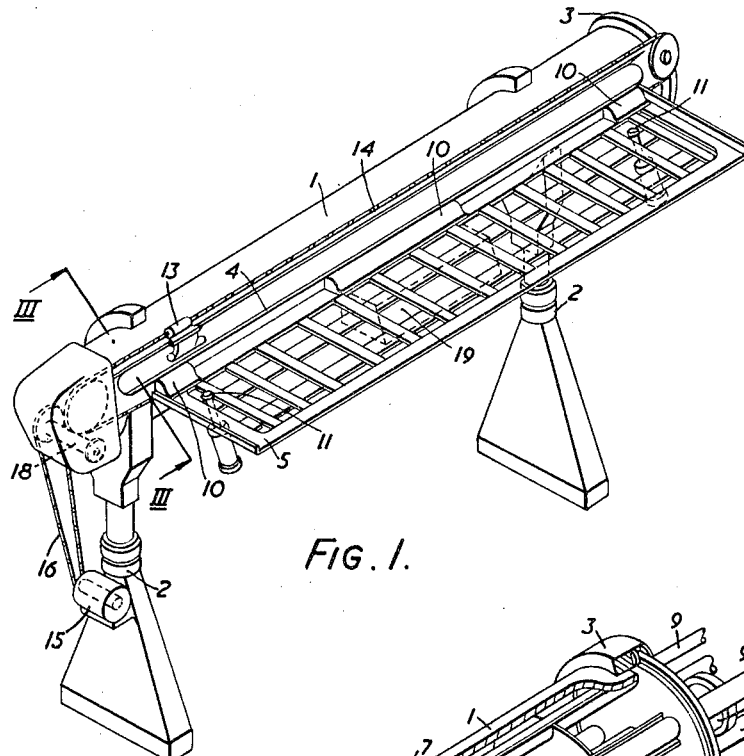

June 12, 1962    F. W. HAMILTON    3,038,636
MULTI-SPINDLE AUTOMATIC MACHINE TOOLS
Filed March 18, 1959    3 Sheets-Sheet 1

INVENTOR
F. W. HAMILTON
BY
Mawkinney + Mawkinney
ATTORNEY

June 12, 1962 F. W. HAMILTON 3,038,636
MULTI-SPINDLE AUTOMATIC MACHINE TOOLS
Filed March 18, 1959 3 Sheets-Sheet 2

INVENTOR
F. W. HAMILTON
BY
Mawhinney + Mawhinney
ATTORNEY

June 12, 1962     F. W. HAMILTON     3,038,636
MULTI-SPINDLE AUTOMATIC MACHINE TOOLS
Filed March 18, 1959     3 Sheets-Sheet 3
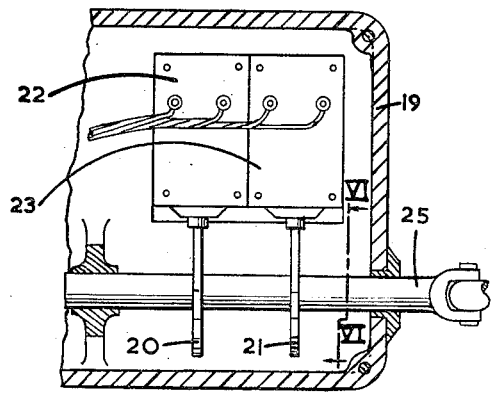
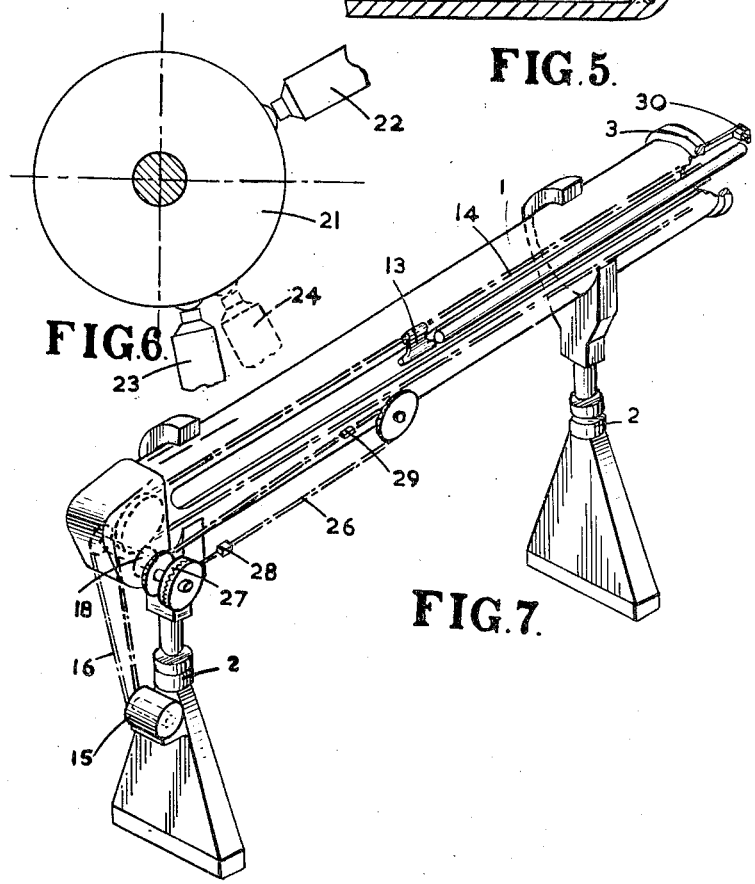
INVENTOR
FRANCIS WILLIAM HAMILTON
BY McWhinney & McWhinney
ATTYS.

United States Patent Office 3,038,636
Patented June 12, 1962

3,038,636
MULTI-SPINDLE AUTOMATIC MACHINE TOOLS
Francis William Hamilton, % Birfield Tools Limited,
Bodmin Road, Coventry, England
Filed Mar. 18, 1959, Ser. No. 800,149
Claims priority, application Great Britain Mar. 21, 1958
3 Claims. (Cl. 221—234)

The invention relates to multi-spindle automatic machine tools and is particularly concerned with a magazine for loading bars to such a machine tool.

Multi-spindle automatic lathes having a stock reel mounted adjacent a spindle carrier are known, the stock reel being indexed at intervals during operation of the lathe. Bars are fed to such lathes through tubes extending from the stock reel, there being one tube associated with each spindle. To load such a lathe a bar is inserted by hand into each tube and is urged axially within the tube until feed fingers associated with the appropriate spindle engage the bar and take charge of feeding the bar through the lathe. The operation continues automatically until the bars have been exhausted, when it is necessary for an operator to load fresh bars into the tubes. The cycle of operation of a multi-spindle automatic lathe may be so fast that it is not possible to load each tube sufficiently quickly by hand and an object of the invention is to provide a loading magazine for a multi-spindle automatic machine tool, whereby the loading can be effected automatically.

According to the invention a bar loading magazine for a multi-spindle automatic machine tool, comprises a carrier, mounted for rotary indexing and formed from a plurality of rigidly connected and axially spaced coaxial discs, each disc having a number of notches spaced equidistantly around its periphery and axially aligned with corresponding notches in the other discs, the number of notches in each disc being equal to the number of spindles of the machine-tool, and the width of each notch, at the periphery, being greater than the maximum transverse dimension of a bar, a non-rotatable tubular casing coaxially surrounding the carrier and having an axially extending slot through which a bar can be inserted transversely to its length into notches indexed to a position in which they are open to the slot, the notches being closed by the tubular casing in all other positions, loading means arranged to insert a bar through the slot and means arranged to urge the bar axially towards the machine tool.

Preferably the carrier discs are interconnected by axially extending troughs joining corresponding notches of each disc, and arranged to co-operate with the tubular casing to form axially extending tubes, each tube being arranged to contain a bar.

The means for inserting a bar through the slot may comprise an inclined rack, on which a plurality of bars can be laid side-by-side and substantially parallel with the slot, and at least two plungers arranged to be extended, when a bar is to be inserted into the slot, to lift the bar nearest to the slot into a position in which it can fall through the slot.

Figure 2:
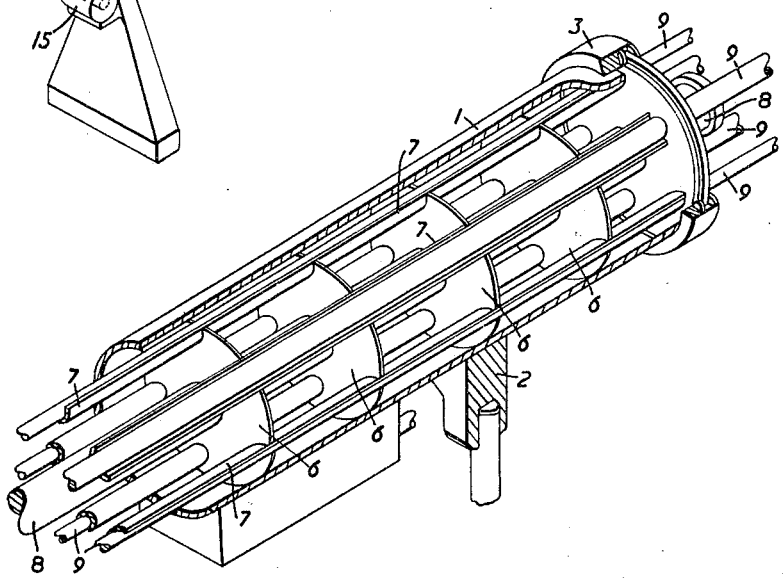
Figure 3:
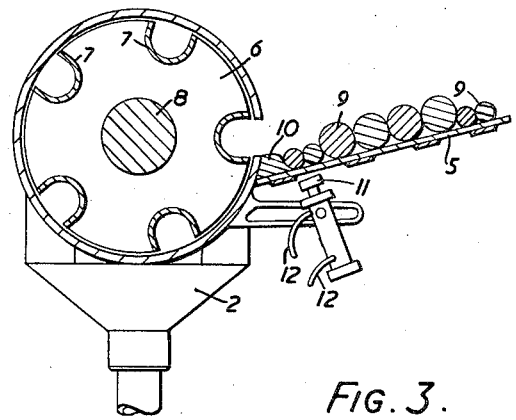
Figure 4:
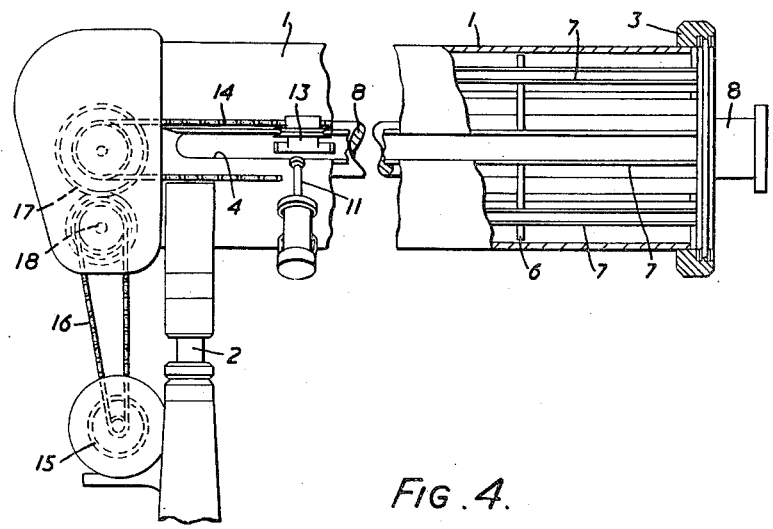

By way of example, a bar loading magazine for a five-spindle automatic lathe will now be described with reference to the accompanying drawings in which:

FIGURE 1 is a perspective view of the magazine;
FIGURE 2 is a perspective sectional view of the end portion of the magazine, adjacent the automatic lathe;
FIGURE 3 is a cross-sectioal view, to a larger scale, through the magazine on the line III—III in FIGURE 1;
FIGURE 4 is a part sectional front view of the magazine, the loading platform having been omitted;
FIGURE 5 is a sectional front view of part of the control box,
FIGURE 6 is a sectional view of the line VI—VI in FIGURE 5, and
FIGURE 7 is a view similar to FIGURE 1; but showing a modification and omitting the loading platform.

The magazine comprises a tubular casing 1 which is mounted at intervals throughout its length on vertically adjustable supports 2 in a horizontal position with one end 3 located adjacent the stock reel of the lathe. The tubular casing 1 has a slot 4 extending almost throughout its length. Mounted on the outside of the tubular casing 1, there is a loading platform 5 extending downwardly towards the slot 4. Bars 9 (see FIGURE 3) placed longitudinally of the tubular casing on the platform will roll or slide in succession towards the slot 4 and are stopped by upstanding lips 10, positioned at the entrance to the slot. Within the tubular casing, there is a carrier, slightly shorter than the casing and comprising a plurality of axially spaced discs 6, positoned at intervals in the tubular casing 1 and mounted on a central shaft 8, coaxial with the casing 1. Each disc 6 has five notches formed equidistantly around its periphery and the discs are connected together by five outwardly-facing troughs 7 positioned in the notches.

The width of each trough 7 at the periphery is greater than the maximum transverse dimension of the bars to be fed to the lathe. For example, if the bars are of circular cross-section, the peripheral width of the troughs is greater than the diameter of the largest diameter bar to be loaded. The carrier is supported for rotation within the tubular casing by bearings at each end thereof and is arranged to be indexed automatically by the stock reel of the lathe. At each indexing position, one trough 7 is open to the slot 4. The tubular casing 1 closely surrounds the carrier, so that each trough, except when open to the slot, is closed by the tubular casing 1 to form a substantially D-shaped tube. Near to each end of the tubular casing 1 and just beneath the slot 4, a plunger 11 is arranged to push a bar resting against the lips 10 upwardly, so that the bar can roll over the lips and enter the slot 4 and the trough 7 registering with it. The plungers 11 are fluid-operated and are controlled substantially in accordance with means for sensing when a bar has been used up and in accordance with the automatic indexing of the carrier. The actuating fluid for the plungers, e.g., oil or compressed air, is conveyed through pipes 12 (see FIGURE 3).

At the end of the slot 4 remote from the automatic lathe, there is a pusher 13 arranged to be urged axially along the trough 7 registering with the slot 4, to push a bar in the trough 7 towards appropriate feed fingers of the lathe, until the feed fingers take over the axial feeding of the bar from the pusher 13. The pusher 13 is moved along the trough by an endless chain 14, driven by an electric motor 15 which is automatically operated when a bar has been inserted through the slot in the tubular casing. The chain is arranged to be reversed, as soon as a bar has been inserted sufficiently for the feed fingers to take charge of its further feeding into the lathe, to withdraw the pusher 13 to a normal position to the extreme left-hand side of the slot, as viewed in FIGURES 1, 2 and 4, in which the pusher is clear of the carrier and the path of bars waiting to be pushed over the lips 10.

The driving connection from the electric motor 15 to the chain 14 includes a reduction chain drive 16 to a lay-shaft 18 and then through a gear system 17 (see FIGURE 3). The lay-shaft 18 also includes a slipping clutch (not shown) capable of transmitting sufficient power to drive the pusher along a trough 7, registering with the slot 4, and to push a bar through the feed fingers of the automatic lathe.

The sensing means, to determine when a new bar is required to be fed to any one spindle of the automatic lathe, is shown in FIGURE 5 and comprises a shaft 25 which is driven through a universal joint from the automatic lathe. The shaft 25 carries two cams 20 and 21 which are each arranged to actuate a limit switch, at a particular angular station. The limit switch 24 arranged to be actuated by a stop in the automatic lathe is arranged at an angular position intermediate those of 22 and 23. The limit switch 24 has conveniently been shown in FIGURE 6, although it is actually in the lathe. The limit switches 22 and 23 and the cams 20 and 21 are housed in the control box 19. The stop which actuates the limit switch 24 is normally arranged to be engaged by the forward end of a bar; but it is swung out of the way of the bar, each time a new bar is fed into the lathe, until that bar has been faced. The limit switches 22, 23 and 24 are connected in an electrical circuit in the control box 19, which actuates a solenoid-operated valve (not shown), which actuates the plungers 11 to lift a new bar over the lips 10 and hence into the carrier. The limit switches 22 and 23 are operated when the feed fingers of the automatic lathe open and close, respectively, and the limit switch 24 is operated when the forward end of a bar reaches the stop associated with the switch 24. When a bar of sufficient length is present in the paths of the feed fingers, the limit switches 22, 24 and 23 are operated in that order; but when a bar is not present, only switches 22 and 23 will be operated, the switch 24 remaining non-operative. The electrical circuit is such that operation of switch 24 opens the switch 22, so that when the switch 23 is operated, the solenoid-operated valve will not be actuated. This is the normal state of affairs, when a bar is present. When a bar is not present the switch 24 will not be operated and hence the solenoid-operated valve will be actuated. The indexing of the carrier is stopped with the appropriate tube 7, in register with the slot 4 and the plungers 11 are actuated to lift the first bar over the lips 10. After the plungers 11 have been actuated to lift a bar over the lips 10, they remain extended until the bar is correctly positioned in the carrier, to prevent a second bar from attempting to follow the first bar into the slot. When the bar is correctly positioned in the trough 7, in register with the slot 4, the electric motor 15 is automatically operated to move the pusher 13 along the slot 4. When the new bar has been engaged by the feed fingers of the lathe, the pusher 13 is automatically withdrawn to the left-hand position and the carrier is indexed by the lathe stock reel, until the limit switches detect that a new bar is required at another spindle. The control box 19 also includes push button controls (not shown) for initially indexing the carrier, so that a bar can be introduced to each spindle.

The bar-loading magazine just described enables bars of random length and of different diameter to be loaded. The random length is accommodated for by mounting the plunger 13 on the endless chain, extending the whole length of the casing 1 and bars of different diameter are accommodated by making the plungers 11 laterally adjustable towards the lips 10 for small diameter bars, so that there is no possibility of the plungers 11 pushing two bars simultaneously over the lips 10.

Instead of the chain-operated pusher 13, the bars could be fed axially by pneumatic means. Each trough 7 could contain at the end remote from the automatic lathe a cylinder and pistons actuated by compressed air and arranged to be supplied with compressed air by means of a rotating manifold in synchronism with the lathe operation. The pistons may be operated comparatively slowly to push the bars along the troughs to the feed fingers or very quickly so that the bars are given an impulse to propel them to the feed fingers.

The bar-loading magazine may be associated with a short-fed stop of the automatic lathe, whereby a new bar can be faced before being fed forward to the normal top for the first component to be made. The short-feed stop can be of any convenient form, and could be arranged to operate a limit switch or air valve which is arranged to reverse the chain 14, so that the pusher 13 is withdrawn from the end of the bar.

An alternative short feeding control arrangement is shown in FIGURE 7. In this arrangement, the lay-shaft 18 also drives another endless chain 26, hereinafter referred to as the metering chain. The drive between the lay shaft and the metering chain 26 includes a dog clutch 27, or other positive driving clutch. The metering chain carries a stop 28 which is arranged to engage a limit switch or air valve 29 at a predetermined position in its travel. At the end 3 of the carrier there is another limit switch or air valve 30 arranged to be operated when the forward end of a bar leaves the carrier. The switch 30 is arranged to close the dog clutch 27, so that at the instant the forward end of a bar leaves the carrier the metering chain 26 and the stop 28 commence to move. The switch 29 is so positioned that the time taken for the stop 28 to reach the switch 29, is equal to the time taken for the forward end of the bar to travel between the switch 30 and the short feed position in the lathe. The switch 29 is connected in an electrical circuit to stop the metering chain 26 and the main chain 14 and so halt the pusher 13.

Another feature of the magazine according to this invention is the provision of interchangeable guide bushes for different size bars at the ends of the troughs adjacent the end 3 of the casing, to restrict lateral movement of the bars as the spindle rotates. This would reduce the noise of the bars hitting the walls of the troughs and the tubular casing 1.

Instead of the carrier being indexed by the stock reel of the lathe, a separate indexing motor can be provided together with appropriate synchronising means linking the motor and the operating cycle of the lathe.

In some automatic multi-spindle machines, there is provision for automatically stopping the machines when a bar has become so short that it leaves the feed fingers. This automatic stopping device, when provided, can be used, to signal to the control box 19 that a new bar should be loaded into the carrier to replace the bar which has nearly been used, instead of the sensing means described hereinbefore.

Although the above description has been directed to a five-spindle automatic lathe, the invention may be applied to any multi-spindle automatic machine tool. By multi-spindle is meant a machine tool having two or more spindles.

What I claim as my invention and desire to secure by Letters Patent of the United States is:

1. A bar-loading magazine for a multi-spindle automatic machine tool, comprising a carrier adapted for rotary indexing movement with the spindles of said tool, said carrier having a plurality of peripheral outwardly open bar guides equal in number to said spindles and arranged for alignment individually with the latter, non-rotatable means surrounding said carrier to retain bars loaded transversely into said guides but to leave one of the latter open when indexed into register with a loading station, loading means for inserting a bar into the carrier at said loading station, a pusher arranged to be moved behind a loaded bar to urge the latter axially towards the machine tool until feed fingers in the machine tool take over axial feeding of the bar, a short-feed stop which enables a freshly loaded bar to be fed to a position in which it can be faced-off before being fed forward by a sufficient distance for a component to be made from the bar, and an endless chain to which the pusher is attached and by which it is moved, said chain extending throughout substantially the whole length of said carrier and arranged to be controlled automatically by control means of the machine tool, said control means including a control incorporated in said short-feed stop and arranged when actuated to stop the forward movement of said chain.

2. A bar-loading magazine for a multi-spindle automatic machine tool, comprising a carrier adapted for rotary indexing movement with the spindles of said tool, said carrier having a plurality of peripheral outwardly open bar guides equal in number to said spindles and arranged for alignment individually with the latter, non-rotatable means surrounding said carrier to retain bars loaded transversely into said guides but to leave one of the latter open when indexed into register with a loading station, loading means for inserting a bar into the carrier at said loading station, a pusher arranged to be moved behind a loaded bar to urge the latter axially towards the machine tool until feed fingers in the machine tool take over axial feeding of the bar, an endless chain to which the pusher is attached and by which it is moved, said chain extending throughout substantially the whole length of said carrier and arranged to be controlled automatically by the machine tool, a second endless chain, driving means for said second chain, a control switch arranged to start movement of said second chain and so positioned as to be operated by the forward end of a bar on leaving said carrier, a stop carried on said second chain, and a further control switch arranged to be operated by said stop to stop both said chains, said further control switch being so positioned that it is operated when the forward end of the bar reaches a short-feed position in which position it is halted while said forward end is faced.

3. A bar-loading magazine for a multi-spindle automatic machine tool, comprising a carrier adapted for rotary indexing movement with the spindles of said tool, said carrier having a plurality of peripheral outwardly open bar guides equal in number to said spindles and arranged for alignment individually with the latter, non-rotatable means surrounding said carrier to retain bars loaded transversely into said guides but to leave one of the latter open when indexed into register with a loading station, loading means for inserting a bar into the carrier at said loading station, a pusher arranged to be moved behind a loaded bar to urge the latter axially towards the machine tool until feed fingers in the machine tool take over axial feeding of the bar, an endless chain to which the pusher is attached and by which it is moved, said chain extending throughout substantially the whole length of said carrier and arranged to be controlled automatically by the machine tool, a second endless chain, common driving means for both said chains, a drive connection between said common driving means and said second chain including a positive driving clutch, a control switch so positioned as to be operated by the forward end of a bar on leaving said carrier, said clutch being engageable in response to operation of said control switch, a stop carried on said second chain, and a further control switch arranged to be operated by said stop to stop both said chains, said further control switch being so positioned that it is operated when the forward end of the bar reaches a short-feed position in which position it is halted while said forward end is faced.

References Cited in the file of this patent
UNITED STATES PATENTS

| 1,765,825 | Cork | June 24, 1930 |
| 2,320,039 | Jobert | May 25, 1943 |
| 2,646,087 | Jobert | July 21, 1953 |
| 2,811,240 | Venton | Oct. 29, 1957 |